United States Patent [19]

Bataille

[11] Patent Number: 5,866,826

[45] Date of Patent: Feb. 2, 1999

[54] METHOD AND DEVICE FOR THE CUSTOMIZATION OF A HELMET WITH NIGHT VISION OPTICAL DEVICE

[75] Inventor: Alexandre Bataille, Bordeaux, France

[73] Assignee: Sextant Avionique, Velizy Villacoublay, France

[21] Appl. No.: 876,741

[22] Filed: Jun. 16, 1997

[30] Foreign Application Priority Data

Jun. 21, 1996 [FR] France .................................. 96 07753

[51] Int. Cl.⁶ .................................................. A42B 3/02
[52] U.S. Cl. ........................................ 73/865.6; 359/409
[58] Field of Search ............................. 73/865.6, 866.5; 29/404; 2/6.6, 6.7; 269/902, 47, 48.1, 48.2, 49; 359/409–411; 248/542, 543

[56] References Cited

U.S. PATENT DOCUMENTS

| | | | |
|---|---|---|---|
| 4,611,743 | 9/1986 | Williams | .................................. 269/49 |
| 5,005,813 | 4/1991 | Lawrence | .................................. 269/902 |
| 5,179,735 | 1/1993 | Thomanek . | |
| 5,573,229 | 11/1996 | Lycan | ......................................... 269/49 |

*Primary Examiner*—Robert Raevis
*Attorney, Agent, or Firm*—Oblon, Spivak, McClelland, Maier & Neustadt, P.C.

[57] ABSTRACT

The disclosed method provides for the precise positioning of the night vision device with respect to the helmet to which it has to be fixed, in order that the user may enjoy optimum viewing conditions. This method consists in determining the position of the support of the device with respect to significant points of the user's head, in contact with the helmet, and then in copying these relative positions on a supporting tool bearing the helmet and the support of the night vision device, and in forming thickness shims between the helmet and the support.

7 Claims, 2 Drawing Sheets

METHOD AND DEVICE FOR THE CUSTOMIZATION OF A HELMET WITH NIGHT VISION OPTICAL DEVICE

BACKGROUND OF THE INVENTION

The present invention relates to a method and device for the customization of a helmet with a night vision optical device.

Helmets for pilots of military aircraft that have to carry out night missions are fitted out with night vision devices provided with electronic light intensifiers. The earliest night vision devices fixed to these helmets were relatively bulky <<binocular>> type devices. They gave way to more compact <<eyeglass>> type devices with folded optical paths.

These night vision devices have to be adapted to the vision of each user, and their settings are limited and relatively complicated to make, especially as the size of their pupil is relatively small (generally with a diameter of 10 to 15 mm). This makes it necessary to achieve the precise positioning of their eyepieces in relation to the pilot's eyes.

Now, these night vision devices are linked to the helmet, and there is very little precision in the position of the helmet with respect to the pilot's head, even when the helmet is provided with elements for easy wear and customization (generally consisting of the injection of foam between the inner shell and the user's head). Furthermore, the very geometry of the helmet is such that it is not possible to obtain a very precise positioning of the inner shell with respect to the fastening base of the night vision device, which is fixed to the outer shell.

To resolve these problems of relative positioning, firstly between the pilot's head and the inner shell and, secondly, between the inner shell and the outer shell, it could be planned to add different adjusting devices for adjustment according to the different degrees of freedom (inter-pupil distance and geometrical orientation with major lengths of travel to compensate for the different positioning errors and manufacturing tolerance values). Such approaches have two major drawbacks. The first drawback is the substantial mass of these setting devices. The second drawback, in the case of the use of night vision eyeglasses, is the fact that disparities in position between the optical module of these eyepieces and the helmet have repercussions on the relative position between these eyepieces and the visor: this visor, which is linked to the helmet, should be capable of passing in front of these eyepieces without catching them. The result thereof is that these approaches result in an increased complexity of the hinging mechanism of the visor and/or greater bulk in the visor and/or greater bulk in the helmet.

SUMMARY OF THE INVENTION

An object of the present invention is a method used for the precise positioning of the optical system of a helmet night vision device, and especially its pupil, with respect to the user's eyes, a device that is simple to implement and hardly complicates or burdens the helmet. An object of the present invention is also a device for the implementation of this method.

In the method according to the invention, after the user's eye has been positioned with respect to reference zones of the inner surface of the helmet, these reference zones are copied on a support tool, the helmet being placed on these zones in a position corresponding to the position that it would have on the user's head, and then the fastening support of the night vision device is fixed to the supporting tool in a position corresponding to said position of the eye with respect to the reference zones, and a thickness shim is formed between the fastening support of the night vision device and the outer shell of the helmet.

The device according to the invention comprises a measuring stand comprising adjustable support means for the helmet, adjustable stops copying the relative positions of reference zones corresponding to particular points of support of the inner surface of the helmet on the user's head, and an adjustable fastening element for the support of the night vision optical system.

BRIEF DESCRIPTION OF THE DRAWINGS

The present invention will be understood more clearly from the following detailed description of an exemplary, non-restrictive embodiment, illustrated by the appended drawings, of which.

MORE DETAILED DESCRIPTION

First of all, the user's eye is positioned in a manner known per se (for example on an optical stand for the customization of helmets) with respect to the inner surface of the helmets. In practice, it is enough to have four reference zones of this inner surface to define it in the context of the invention. These four reference zones are, for example, those corresponding to the top of the user's cranium, and three zones of the front edge of the helmet (the tip of this edge and the two zones of the user's temples that are opposite to each other) for example.

Figure 1:
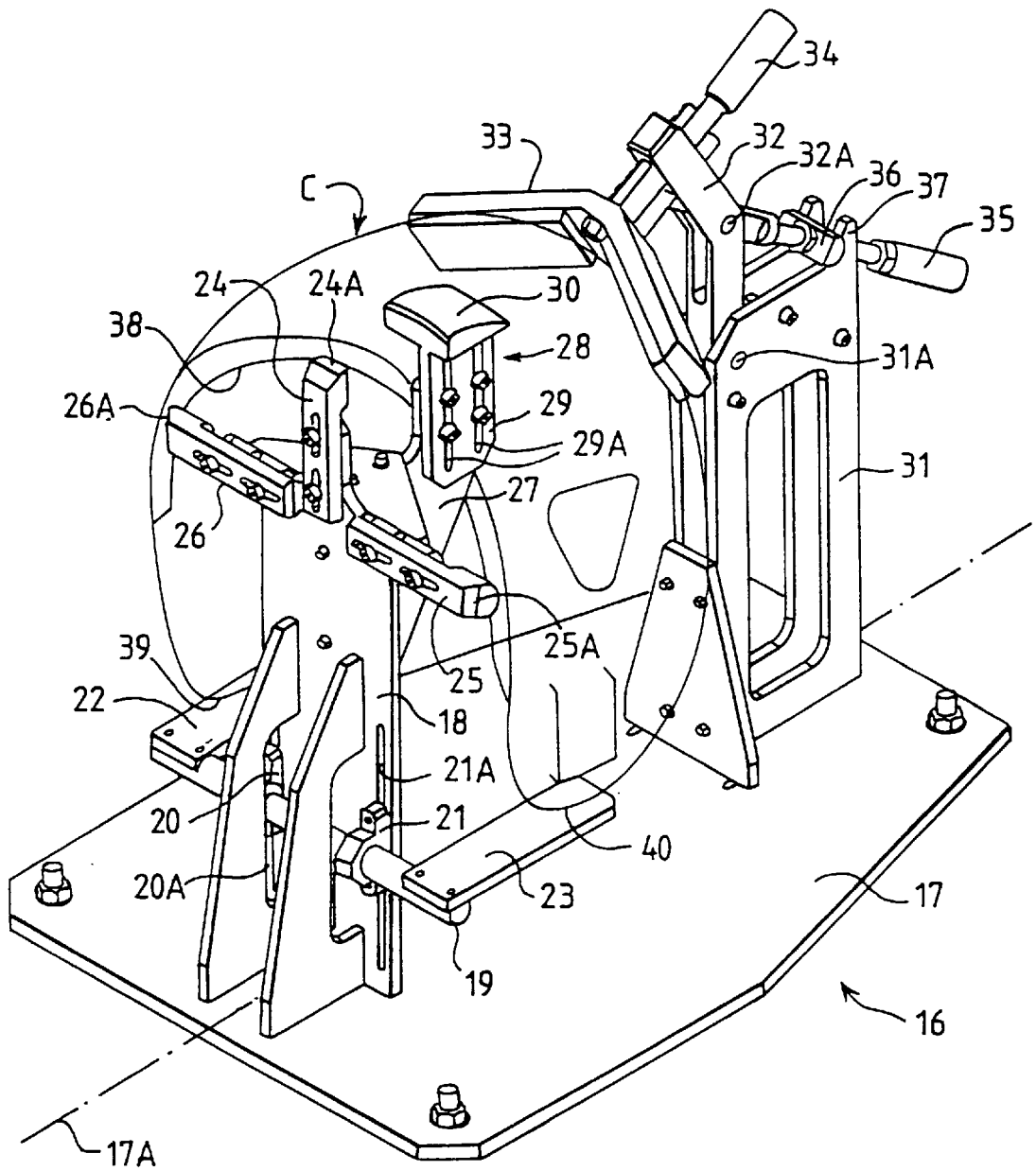
FIG. 1 is a view in perspective of a measuring stand, according to the invention, showing the means for the positioning of the inner shell of the helmet, without the adjustable fastening element for the support of the night vision optical system.
Figure 2:
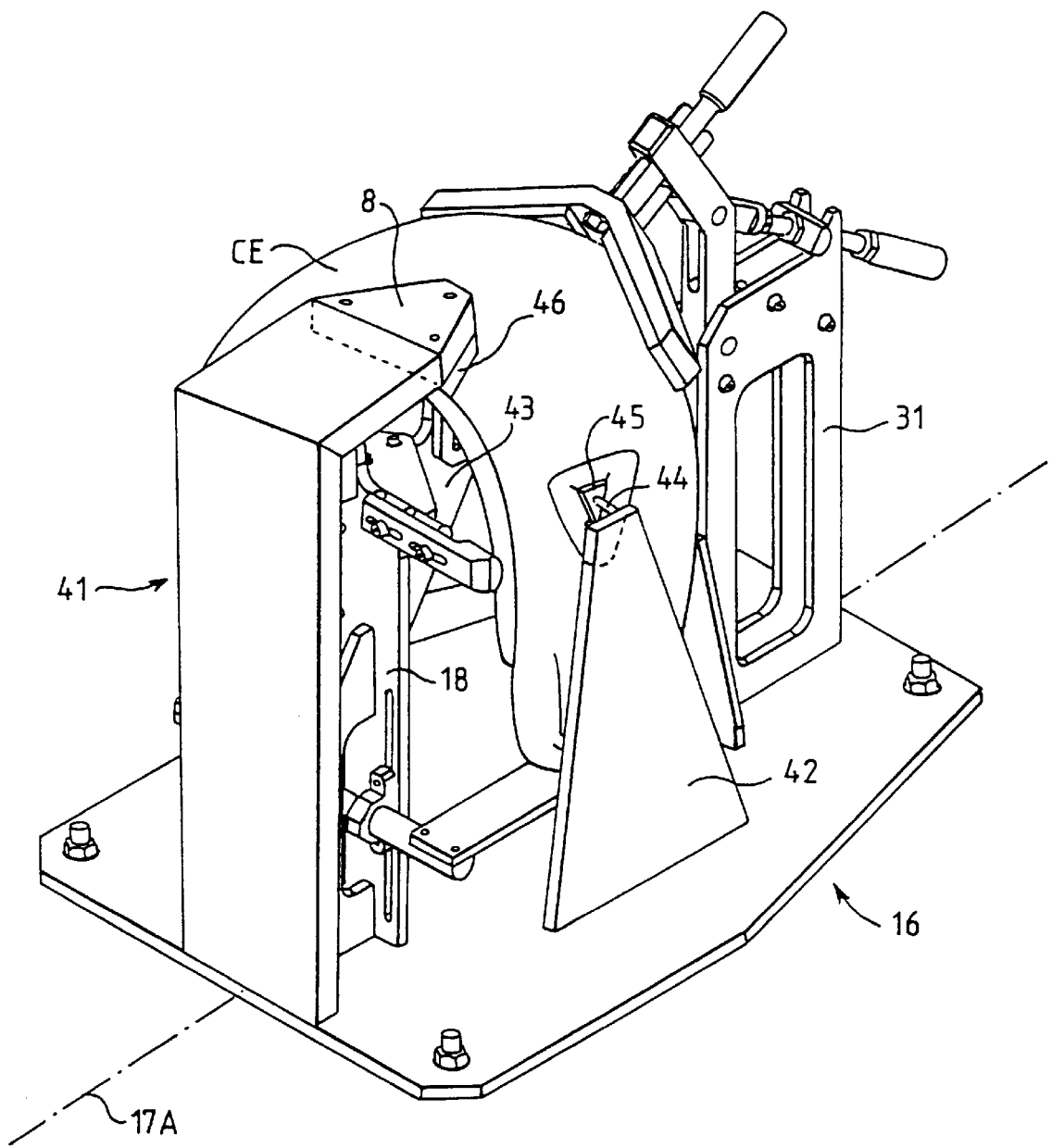
FIG. 2 is a view of the stand of FIG. 1, with the adjustable fastening element of the night vision optical system.

FIGS. 1 and 2 show the measuring stand 16 of the invention, used to fix the relative positions of the night vision device and of the helmet.

In FIG. 1, the helmet C is taken to be transparent in order to simplify the drawing, it being understood that, during the use of the stand 16, the helmet is whole, its two shells being definitively fixed to each other.

The axis of longitudinal symmetry of the base 17 of the stand 16 is referenced 17a. This axis is parallel to the longitudinal axis of the helmet when it is placed on the stand 16. An intermediate fastening element 18 is fixed to the base 17, to its front part, substantially perpendicular to this base and symmetrical with respect to the axis 17a. A rod 19 is fixed to the intermediate fastening element 18, near its base. This rod 19 is placed so as to be perpendicular to the axis 17A and symmetrical to it. The rod 19 is fixed to the intermediate fastening element 18 by means of collars 20, 21. The screws that fasten these collars 20, 21 to the intermediate fastening element 18 are able to move in buttonholes 20A, 21A, made in the intermediate fastening element 18, perpendicularly to the base 17. Small bars 22, 23 are attached to the rod 19, symmetrically with respect to the axis 17A. The resting position of these small bars is substantially horizontal. These small bars 22, 23 are fixed by one of their ends to the rod 19 and are oriented towards the rear of the base 17.

Three rectangular-sectioned rods 24, 25 and 26 are fixed to the upper part of the intermediate fastening element 18. These three rods have longitudinal buttonholes through which their fastening screws pass. This makes it possible to position these three rods longitudinally. The rod 24 is perpendicular to the base 17 and its longitudinal axis intersects the axis 17A. The rods 25, 26 are affixed so as to be parallel to the base 17 and symmetrical with the axis 17A.

A small intermediate fastening element 27 is attached to the rear face of the intermediate fastening element 18, in its upper part. This small intermediate fastening element 27 is perpendicular to the surface of the intermediate fastening element 18 and parallel to the axis 17A. A foot 28 is fixed to this small intermediate fastening element 27. This foot 28 consists of a plate 29 and a sole 30, substantially perpendicular to the plate 29. The plate 29 has longitudinal buttonholes 29A, through which there pass fastening screws, making it possible to adjust the height at which it is fastened with respect to the base 17. The upper surface of the sole 30 is convex and its shape corresponds to the shape of the inner surface of the inner shell of the helmet supported on this surface.

A support pedestal 31 is fixed to the rear of the base 17. This support pedestal 31 supports an arm 32 that is oriented upwards and is hinged with respect to the pedestal 31 about an axis 31A parallel to the base 17 and perpendicular to the axis 17A. The plane of symmetry of the arm 32 passes through the axis 17A. The arm 32 bears a V-shaped cap 33 that is symmetrical with respect to the plane of symmetry of the arm 32. The distance from the V-shaped cap 33 to the arm 32 can be adjusted by means of a screw 34, connecting the cap to the arm. One end of an adjusting screw 35 is connected to the arm 32, approximately in the middle of this arm, by means of a hinged link 32A. At its other end, the screw 35 has a stop 36 into which it is screwed. The stop 36 rests on a protuberance 37 of the support 31. Thus, the elements 35 to 37 form an adjustable stop for the arm 32 in its rotation towards the rear of the base 17. The cap 33 takes support on the rear upper part of the helmet when it is in position on the tool 16, and is designed to adjust its symmetry with respect to a plane perpendicular to the base 17 and passing through the axis 17A.

FIG. 1 shows the helmet in position on the tool 16. The cap 33 is tilted towards the rear to enable the positioning of the helmet. The inner shell 38 takes support on the sole 30 (whose position corresponds substantially to the top of the user's cranium) and on the front faces of the ends of the rods 24 to 26 (which are in contact with the front edge of the shell 38). The lower ends 39, 40 of the helmet take support on the free ends of the small bars 22, 23 which enable an adjustment of rolling motion (about an axis substantially parallel to the axis 17A) of the helmet.

The locations of the front surfaces 24A to 26A of the rods 24 to 26 are set to correspond to said reference zones of the front edge of the inner shell of the helmet.

With the helmet taking support on the surfaces 24A to 26A and 30, the position of the small bars 22 and 23 is set so that the ends 39 and 40 of the helmet are in the same horizontal plane, without the helmet's losing contact with the surfaces 24A to 26A and 30. The setting of the position of the cap 33 is used to provide greater precision to the setting of the symmetry of the helmet with respect to a vertical plane passing through the axis 17A, its setting being done after that of the small bars 22, 23.

With the position of the helmet C being set with respect to the reference surfaces (24A to 26A, 30), it can be estimated that it is practically the same as the accurate position of the helmet on the user's head. The fastening support 8 of the night vision device (not shown) can then be positioned on the helmet in its optimum position. Indeed, the respective spatial positions of the user's head and of the night vision device, and especially of the fastening support 8 of this device, are known as precisely as possible. With the helmet being in contact with surfaces of the user's head at least in the characteristic zones, the respective relative positions of the helmet and of the night vision device are deduced therefrom. Consequently, it is enough to fasten the night vision device to the stand 16 in the same spatial position with respect to the surfaces 24A to 26A and 30 that it occupied on the stand 1 with respect to the surfaces of the characteristic zones, for it to be accurately positioned with respect to the helmet and therefore with respect to the user's eyes.

As can be seen in FIG. 2, to position the support 8 on the stand 16, a bracket 41 is fixed to the base 17, before the intermediate fastening element 18, symmetrically with respect to the axis 17A. This bracket 41 has adjustment means (not shown) used to adjust the spatial position of the support 8 that it bears at its end. FIG. 2 also shows two plates 42, 43 fixed to the base 17, perpendicularly to this base, laterally framing the helmet, symmetrically with respect to the axis 17A, at a short distance from the helmet. These plates 42, 43 each carry an adjustable short rod supporting a small surface applied to the side corresponding to the helmet, approximately at the level of the user's eyes. In FIG. 2, only the rod 44 and surface 45 relating to the plate 42 (corresponding to the left-hand side of the helmet) can be seen. When the position of the helmet on the stand 16 is properly set, as described here above, the surface 45 and the corresponding right-hand surface are applied to the helmet to keep it properly in position. With the position of the support 8 being also properly set, it is observed that, for a series of helmets, given the manufacturing tolerance values, and the tolerance values of the positioning of the inner shell with respect to the outer shell, the support 8 is generally located at a variable distance (a few millimeters) from the outer shell CE. Consequently, one or more shims 46 are inserted between the support 8 and the outer shell of the helmet. The thickness of these shims corresponds to said variable distance. This shim may be metallic or may be made of a plastic material that is hard enough so as not to be crushed during the fastening of this support 8. When the shim 46 is in position, this support 8 is fastened, for example by means of three screws as can be seen in FIG. 2. Naturally, instead of using only one shim 46 for which the thickness must be adjusted by machining, it is possible to use several thinner shims, chosen from a set of various assorted shims.

What is claimed is:

1. A method for the precise positioning of the optical system of a night vision device with respect to the user's eyes wherein, after the user's eye has been positioned with respect to reference zones of the inner surface of the helmet, these reference zones are copied on a support tool, the helmet being placed on these zones in a position corresponding to the position that it would have on the user's head, and then a fastening support of the night vision device is fixed to the supporting tool in a position corresponding to said position of the eye with respect to the reference zones, and a thickness shim is formed between the fastening support of the night vision device and the outer shell of the helmet.

2. A method according to claim 1, wherein the reference zones are those of the rear edge of the inner shell of the helmet, as well as the zone in contact with the top of the user's cranium.

3. A method according to claim 1, wherein the positional symmetry of the helmet is adjusted on the supporting tool.

4. A method according to claim 1, wherein the rolling motion of the helmet is adjusted on the supporting tool.

5. A device for the precise positioning of the optical system of a night vision device for a helmet with respect to the user's eyes, comprising a measuring stand comprising adjustable support means for the helmet, adjustable stops copying the relative positions of reference zones corresponding to supporting surfaces and an adjustable fastening element for the support of the night vision optical device.

6. A device according to claim 5, comprising adjustable means that support the lower lateral ends of the helmet.

7. A device according to claim 5 or 6, comprising a V-shaped cap that is symmetrical to the plane of symmetry of a second stand, applied to the outer shell of the helmet, close to its top, to adjust its positioning symmetry.

\* \* \* \* \*